United States Patent [19]
Trelut et al.

[11] 3,932,843
[45] Jan. 13, 1976

[54] REAL-TIME CONTROL ARRANGEMENT FOR A SIMULATION DEVICE

[75] Inventors: Jean Marie Trelut, La Celle St. Cloud; Jean Bernard Michel Liot, Bailly; Therese Marie Leonie Cagnac, Paris; Antoine Jean Louis Chambet-Falquet, Igny, all of France

[73] Assignee: International Standard Electric Corporation, New York, N.Y.

[22] Filed: Nov. 23, 1973

[21] Appl. No.: 418,649

[30] Foreign Application Priority Data
Nov. 30, 1972 France............................. 72.42564

[52] U.S. Cl................ 340/172.5; 444/1; 235/152; 235/153 A; 340/146.1 B
[51] Int. Cl.............................................. G06f 15/16
[58] Field of Search ... 340/172.5, 146.1 R, 146.1 B, 340/146.1 BE, 146.1 C, 146.1 D, 146.1 E; 444/1; 235/152, 153 A, 153 AC, 153 AE, 153 AK

[56] References Cited
UNITED STATES PATENTS

| | | | |
|---|---|---|---|
| 3,374,466 | 3/1968 | Hanf et al. | 340/172.5 |
| 3,500,328 | 3/1970 | Wallis | 340/172.5 |
| 3,648,252 | 3/1972 | Thron et al. | 340/172.5 |
| 3,698,007 | 10/1972 | Malcolm et al. | 444/1 |
| 3,702,006 | 10/1972 | Page | 444/1 |
| 3,721,961 | 3/1973 | Edstrom et al. | 444/1 |
| 3,751,645 | 8/1973 | Brandsma et al. | 444/1 |

OTHER PUBLICATIONS
MacDougall, M. H., "Simulation of an ECS-Based Operating System," *1967 Spring Joint Computer Conf.,* Vol. 30, pp. 735–741.

Zucker, M. S., "LOCS: An EDP Machine Logic and Control Simulator," *IEEE Trans. on Electronic Computers,* Vol. EC-14, No. 3, June, 1965, pp. 403–416.

Huesmann, L. R., *The Computer Journal,* Vol. 10, Issue 2, Aug., 1967, pp. 150–156.

Tucker, S. G., "Emulation of Large Systems," *Comm. of ACM,* Vol. 8, No. 12, Dec., 1965, pp. 753–761.

Ginzberg, M. G., "Notes on Testing Real-Time System Programs," *IBM Systems Journal,* Vol. 4, No. 1, 1965, pp. 58–72.

*Primary Examiner*—Paul J. Henon
*Assistant Examiner*—John P. Vandenburg
*Attorney, Agent, or Firm*—John T. O'Halloran; Menotti J. Lombardi, Jr.; Alfred C. Hill

[57] ABSTRACT

A simulation device including a simulation computer is used to simulate peripheral equipment of a real-time system having two stored program computers operating on a load-sharing basis to check and contribute to the development of the two-computer system program. The simulation device includes a time control arrangement containing counters cooperatively arranged with respect to each other and the three computers to check and develop a normally continuously running program by a simulating process which operates in a step-by-step manner and yet maintains the real-time and duration concepts when simulated peripheral equipment is involved in the simulation process and when any time consuming process is simulated.

9 Claims, 5 Drawing Figures

REAL-TIME CONTROL ARRANGEMENT FOR A SIMULATION DEVICE

BACKGROUND OF THE INVENTION

The present invention relates to a real-time control arrangement for a simulation device designed for checking a program used in real-time system which is monitored on a load-sharing basis by two stored program computers, and more particularly where the simulation device includes a third computer connected to the two real-time system computers so as to simulate real-time system peripheral equipment by exchanging with the real-time system computers data which is normally exchanged between real-time system computers and their actual peripheral equipment.

In a known manner, such simulation devices are particularly of interest when it is designed to simultaneously check hardware and software of a complex system such as, for example, a stored program control electronic system. These simulation devices particularly permit the testing of the chain of the elementary programs forming the system stored program. They reveal, on the one hand, conflicts between elementary programs and, on the other hand, certain faults caused by rare event configurations, such faults being too difficult to reproduce by another method.

A known simulation process utilizes a single more powerful computer than those belonging to the system being programmed. This single computer is provided with programs written for the system and with a simulation program, the run of all these programs permitting the desired check. However, such a process does not always permit the running of the programs in real-time conditions. Particularly, it is not easy to simulate the interlacing of input and output instructions, respectively, corresponding to a request and response system.

A second simulation process consists in using an additional simulation computer connected to the two system computers so as to simulate their environment and to permit information exchange identical to information exchange between the two system computers and their peripheral equipment. The second process has the advantage of permitting the running of the programs close to the real run and it is particularly fitted to real-time system development.

However, the use of three computers implies synchronization requirements since it is of particular importance that the sequence of the operations, wherein two computers at least are involved, is respected, such as, for example, data input and output operations. Also, it is important to be able to know the actual duration of these operations.

To enable an easier test and program development, it appears of interest that the run of an operation may be stopped or performed step by step, if necessary, while maintaining real-time and duration concepts. Thus, it is necessary to provide the system with that real-time concept and to interrupt a real-time run, which necessarily results in possibilities of differentiated stops for the three computers.

SUMMARY OF THE INVENTION

Therefore, an object of the present invention is to provide a real-time control arrangement for use in a simulation device designed to develop by means of three computers the program of a real-time system which is operated on a load-sharing basis by a so-called operational group of two stored program operational computers.

A feature of the present invention is the provision of a simulation device designed for the development of a program to be used in a real-time operated system including first and second computers operating on a load-sharing basis, the simulation device comprising a third computer coupled to the first and second computers to simulate their peripheral equipment in a real system by exchanging with the first and second computers data which would normally be exchanged between the first and second computers and their real system peripheral equipment; and a real-time control arrangement including a real-time counter coupled to the first, second and third computers to count real operation time of a program for the real-time system, to subdivide the real operation time into equal steps and to transmit a predetermined signal at the end of each of the steps, a shift counter coupled to the first, second and third computers to delay the turning on of one of the first and second computers with respect to the turning on of the other of the first and second computers by a time equal to the time elapsed between a stopping of the one of the first and second computers and a stopping of the other of the first and second computers when both stoppings occurred after a simultaneous operating period of the first and second computers, two timing counters, each of the timing counters being coupled to a different one of the first and second computers and the third computer to delay the turning on of an associated one of the first and second computers with respect to the turning on of the other of the first and second computers by a time equal to a simulated selected real system peripheral equipment response time after the associated one of the first and second computers was stopped due to the transmission of a data input-output order to a simulated selected real system peripheral equipment, and a clock to synchronize the operation of the first, second and third computers, the real-time counter, the shift counter and the two timing counters.

BRIEF DESCRIPTION OF THE DRAWING

The above-mentioned and other features and objects of this invention will become more apparent by reference to the following description taken in conjunction with the accompanying drawing, in which.

DESCRIPTION OF THE PREFERRED EMBODIMENT

Figure 1A:
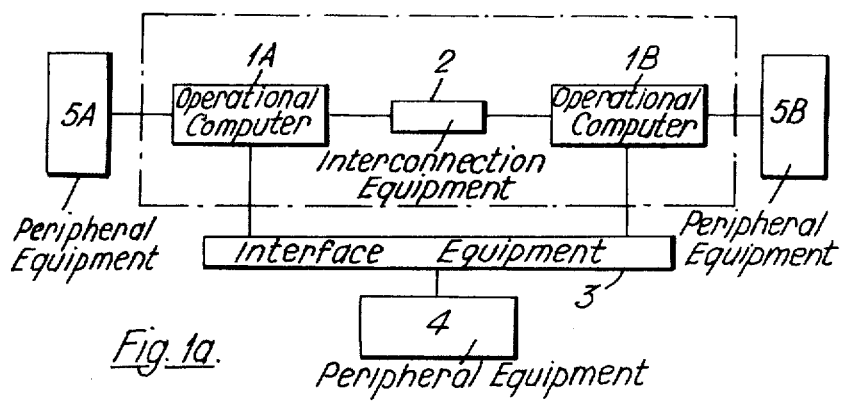
FIG. 1a is a simple block diagram of a system operating on a real-time basis and monitored on a load-sharing basis by two stored program computers.

The block diagram of FIG. 1a illustrates the main elements of a stored program control system for use in a real-time assembly.

The control system conventionally comprises two operational computers 1A and 1B and an interconnection equipment 2 which permits the transfer of information needed for operating computers 1A and 1B on a load-sharing basis.

Computers 1 are connected, via an interface equipment 3, to peripheral equipment 4 which permits the transmission of orders to and the reception of data from the control system.

Moreover, each computer 1 is connected to an individual conventional peripheral equipment 5 which enables data to be manually entered into and to be read out of each computer 1.

Peripheral equipment 4 comprises, for example, scanners and distributors while peripheral equipment 5 comprises, for example, teleprinters, magnetic or punched tape devices and drums.

Figure 1B:
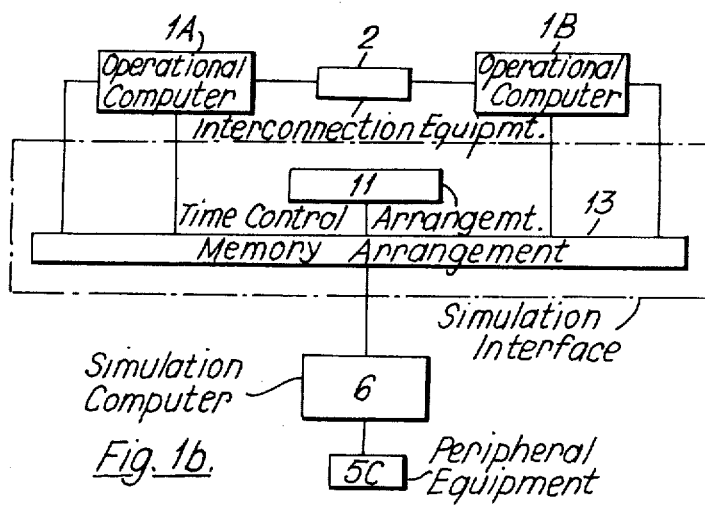
FIG. 1b is a block diagram of a simulation device designed for developing the program of the system shown in FIG. 1a in accordance with the principles of the present invention.

The block diagram of FIG. 1b illustrates the simulation device designed for the development of the program of a system as illustrated in FIG. 1a.

Operational computers 1A and 1B, and their interconnection equipment 2 are shown again. However, peripheral equipment 4 and 5 are replaced by a simulation computer 6 connected to computers 1A and 1B by a simulation interface 7 so as to simulate the connection between the peripheral equipment 4 and 5 and computers 1A and 1B.

Computer 6 has an individual conventional peripheral equipment 5C which permits, on the one hand, to enter data into computer 6, and, on the other hand, to deliver results at the output of computer 6.

Simulation interface 7 thus performs data exchanges between operational computers 1A and 1B and the simulation computer 6. Interface 7 to carry out these data exchanges includes a time control arrangement 11 for synchronizing the exchanges and memory arrangement 13 capable of temporarily storing exchanged data.

In a known manner, the development of a program by a simulation method enables the splitting into a step-by-step manner a sequence of operations which necessarily are performed in a continuous manner in an actual operation. This splitting operation enables the control of each step, and to check whether the conditions foreseen by the programmer are coherent with the result. These resulting conditions are the consequences of previous events. In a real-time basis system, the event sequence order may not be perfectly known in advance to the extent that certain events have a random nature and are mixed with other events which are foreseeable consequences of the previous events. Thus, in a system, the starting time of a random process comprising several known operations cannot be normally foreseen. The starting time of a random process can only be detected because the following operations are known and are necessarily following the initial operation.

A system simulation, such as hereinabove defined, normally eliminates random external events since these external events are simulated by the simulation computer within the scope of the assumed known simulation program and since the time of occurrence of a given event is selected, while it may occur in the actual system at any time.

Figure 2A:
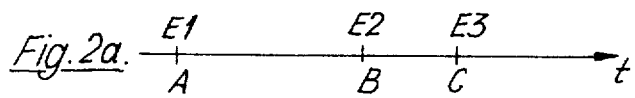
FIGS. 2a and 2b are timing diagrams relative to the sequence of the events in the real system and in the simulation device according to this invention.
Figure 2B:
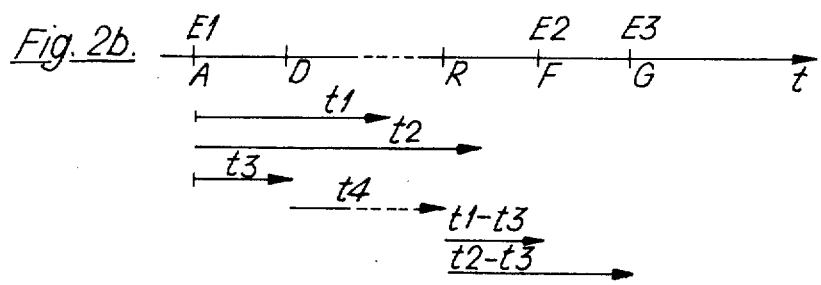

Indeed, if an event E1 having occurred at a time A (FIG. 2a) is followed, on the one hand, by an independent event E2 having occurred at a time B following time A by a time interval $t1$ and, on the other hand, by a dependent event E3 necessarily following after a time interval $t2 > t1$, that is, at time C, and if the system is stopped at the time D (FIG. 2b) following time A by a time interval $t3 < t1$, the operation is unchanged to the extent that event E2 occurs at a time F after a time interval equal to $t1 - t3$ following the time R at which time the system started again and that event E3 occurs at time G after a time interval equal to $t2 - t3$ after the time R regardless of the system stop duration $t4$.

The time elapsed between event E1 and event E3 is equal to the sum of times $t2 + t4$ and has no importance for the simulated system because its real operation time between E1 and E3 remains always $t2$ as in the real corresponding system.

To take into account the possibility of stopping, the real-time control arrangement according to this invention includes a real-time counter 9 (FIG. 3) which produces the sum of the operation periods for the group of operational computers 1 in accordance with the programs of the real system.

The control arrangement according to this invention also includes a clock 8 to provide the time base for operational computers 1A and 1B and counter 9. Computers 1A and 1B have means for inhibiting real-time counter 9 in a certain number of predetermined cases which will be described hereinbelow.

Due to the proper arrangement of the environment simulation device and to the previously mentioned consideration concerning the possibilities to interrupt the simulated system, a stop of an operational computer results in stopping real-time counter 9 and the second operational computer, which enables knowing correctly the system condition at that time.

A computer can be stopped only in a certain number of given conditions and the most frequent of these conditions is at the end of a sequence. As a result, there is a variable time interval from the stopping of one of operational computers 1 to the stopping of the other one. To maintain a correct real-time concept, it is necessary to take into account the lead time gained by one operational computer 1 with respect to the other operational computer 1. This is accomplished by means of a shift counter 10 controlled by clock 8. As a principle of operation, the first one of the two computers 1 which is stopped inhibits counter 9 and triggers counter 10 which is stopped after a time delay "$t$" by the stopping of the second computer 1. When operation is resumed, counter 10 and the first stopped computer 1 are simultaneously turned on, and, after a time delay "$t$", the second computer 1 is allowed to resume operation.

Typically, operational computers are also stopped for data input or output operations in connection with their peripheral equipment, therefore, simulation computer 6 is also stopped within the scope of environment simulation device, such a stop being called a "hang-up stop".

For having a perfect synchronism of data exchanges between the system computers, the time base of simulation computer 6 is also provided by clock 8. To avoid data transmission errors between operational computers 1 and simulation computer 6, there is never a simultaneous operation of computers 1 and computer 6.

When computers 1 are operative, computer 6 is inoperative. Computer 6 runs, for example, on an internal loop. When computer 6 is operative, computers 1 are preferably stopped, and the alternate operation of computers 1 and computer 6 are controlled by the real-time control arrangement according to this invention.

Simulation computer 6 normally does not have the real-time concept as previously mentioned. However, it has to perform input and output operations for data either provided to or received from programmers, via conventional peripheral equipment, symbolized by a teleprinter 12. Thus, it is necessary that computer 6 is capable of dating data that it delivers. For that purpose, real-time counter 9 cyclically transmits a stop order to computers 1, which turns simulation computer 6 on for a time depending on the operation to be performed. It is this cyclic stop order that provides computer 6 with the real-time concept. At each of those cyclic stop orders triggered by counter 9, computer 6 receives information of the cause of the real-time interrupt, which corresponds in that case to the elapse of one time unit, and computer 6 can receive information, if necessary, of input and output data of the two computers 1 at the time of their respective stops, these data being stored in the memory arrangement 13 which particularly stores the values of the cause of the real-time interrupt.

Memory arrangement 13 comprises, in particular, a register 13A capable to temporarily storing control data exchanged between operational computer 1A and control arrangement 11. A register 13B has the same function relative to computer 1B and control arrangement 11. Register 13C has the same function with respect to simulation computer 6 and control arrangement 11. Two registers 13AC and 13BC, respectively, store temporarily data exchanged between each of the two operational computers 1 and computer 6, these data being identical to those exchanged between computers 1 and their peripheral equipment in the real system. The interconnection equipment 2, FIG. 1, has not been shown in FIG. 3, because it may be simulated or not by the computer 6.

Memory arrangement 13 is connected to computers 1 by common connections, usually called a "bus", identical to those connecting computers 1 to their peripheral equipment in the real system. Computer 6 also utilizes a common connection of this type for connection to memory arrangement 13. Real-time control arrangement 11 is connected to the three computers by registers 13A, 13B, 13C and by direct connections, not shown.

Indeed, it must be understood that memory arrangement 13 may be constituted, if necessary, by memory means fitted to the various types of utilized connections, these memory means being constituted, for example, by flip-flops in the case of pulsed data, or by amplifiers in the case of DC (direct current) data.

Conventionally, in a real system, an operational computer is in a hang-up condition after having transmitted a data input or output order to a peripheral equipment to wait a response from the peripheral equipment which requires a certain time delay.

In the described simulation system, one of the computers 1 transmits an input-output order. When this occurs, said one of the computers 1 is triggered to a hang-up condition and also stops the other one of computers 1 so that computer 6 can consider the data which is associated with the input-output order so as to establish response information which would have been given by the simulated peripheral equipment.

When response information is ready to be transmitted, it is necessary to delay their transmission by a time equal to the response time of the concerned peripheral equipment in the real system, after having resumed the real-time.

For this purpose, the time control arrangement 11 comprises a timing counter for each operational computer such as timing counter 14A for computer 1A and timing counter 14B for computer 1B.

Each of counters 14 is selected when its associated computer 1 is triggered to a hang-up condition. Counters 14 are controlled by clock 8 and may be loaded by simulation computer 6 with a value corresponding to simulated peripheral equipment response time. When real-time counter 9 is turned on again by computer 6, counter 9 causes the concerned counter 14 to be counted down. The associated computer 1 is maintained in a hang-up condition up to the time of receiving an acknowledge signal from associated counter 14 at the end of the count-down.

Since two operational computers are utilized and several computer stops are possible, the time control arrangement comprises logic circuitry associated with the various counters to enable the time control arrangement to handle various events. This logic circuitry will be briefly described hereinafter in conjunction with FIG. 3 to illustrate the operation of various components of the logic circuitry in view of the causes or events which render their use necessary.

A first stop event, which directly results from the use of real-time counter 9, is the stopping of computers 1 by an order from counter 9. This stop order is controlled, in particular, by the elapse of a selected real-time unit and, in the embodiment shown in FIG. 3, it results in sending binary type stop signal MILIN from counter 9, when counter 9 fed by clock 8 has measured the selected real-time unit, that is, for example, 1 ms (millisecond).

Stop signal MILIN is, on the one hand, stored in memory register 13C for simulation computer 6 and, on the other hand, is coupled to logic circuit 15 which sends a stop order at the end of a binary type sequence SBS to each of the computers 1 thereby stopping computers 1.

Figure 3:
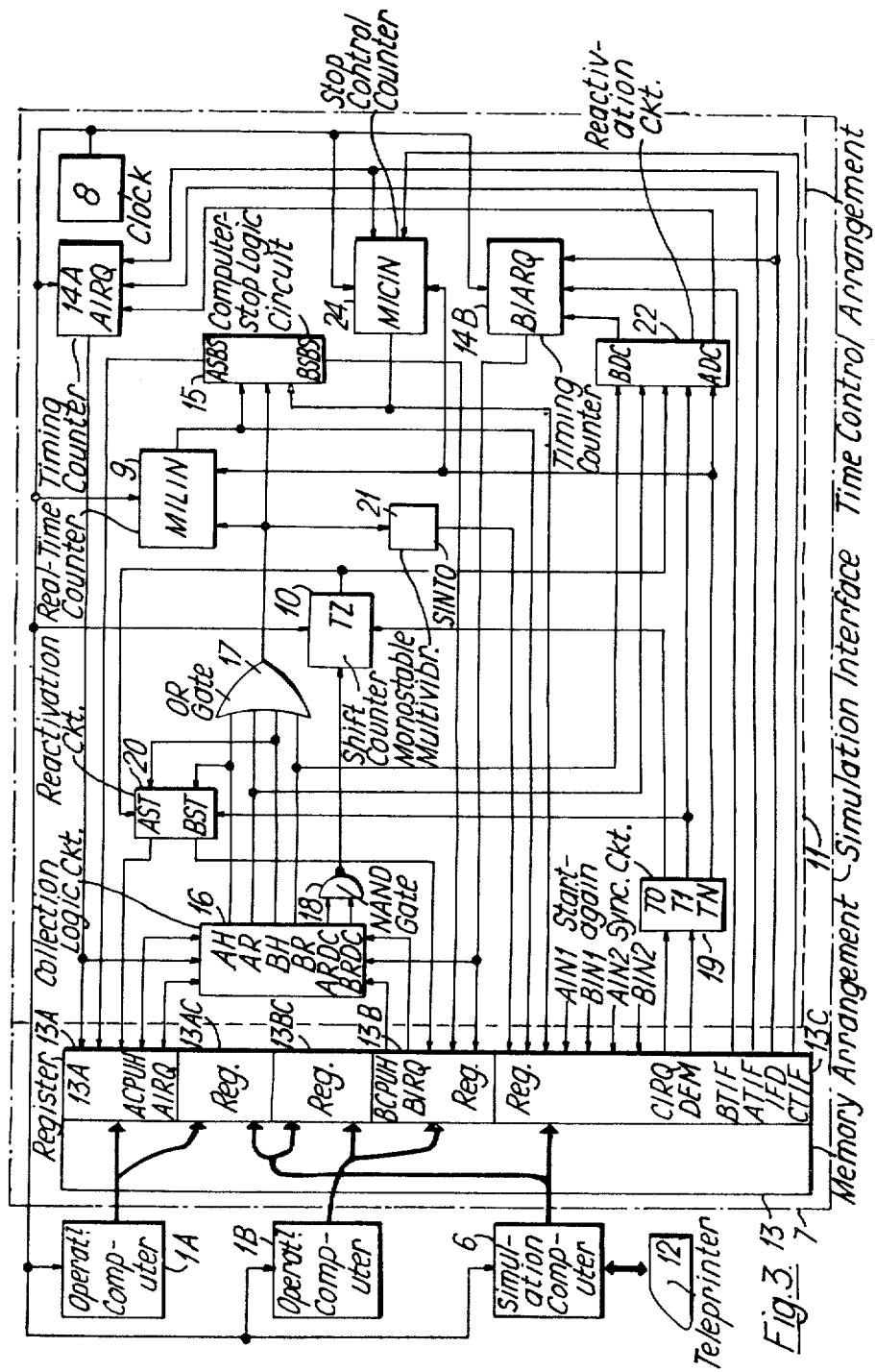
FIG. 3 is a more detailed diagram of the simulation device of FIG. 1b and, more particularly, of the time control arrangement used in this device in accordance with the principles of the present invention.

Circuits shown in FIG. 3 will not be described with many details because they are conventionally embodied by means of conventional integrated circuit logic components combined in a manner that is easily conceivable by people skilled in the art. The two stop orders ASBS and BSBS to computers 1A and 1B are transmitted to those computers via store memory arrangement 13 and the involved connections. The first operational computer 1 which is stopped transmits a binary type stop data CPUH to time control arrangement 7. Assuming that computer 1A is the first stopped, stop data ACPUH is first received and transmitted to one input of collection logic circuit 16 connected to output connections from computers 1 via registers 13A and 13B, which are respectively associated with computers 1A and 1B.

On the one hand, data ACPUH activates one output of circuit 16 which delivers a pulsed binary signal AH to stop real-time counter 9 and, on the other hand, data ACPUH activates a second output of circuit 16 which delivers a stable binary signal ARDC to start shift counter 10, signal ARDC being, for example, produced at an output of a flip-flop activated by data ACPUH. Signal AH is specific to computer 1A and signal BH is specific to computer 1B. Both signals AH and BH may be applied via an OR gate 17, on the one hand, to an inhibit input of counter 9 and, on the other hand, to the input of monostable multivibrator 21 to interrupt simulation computer 6. Multivibrator 21 transmits an interrupt order SINTO.

Signal ARDC is applied to the triggering input of counter 10 via NAND gate 18, which causes a time counting at the rate of clock 8.

The stopping of the second operational computer, that is computer 1B in the present example identically results in transmitting binary data BCPUH from computer 1B via register 13B. Data BCPUH produces stable binary signal BRDC in circuit 16 which is applied to the second input of NAND gate 18. Gate 18 now has its two inputs simultaneously activated, which results in stopping counter 10. Thus, counter 10 has measured a time equal to the time interval between the stop times of the two operational computers 1.

When receiving interrupt signal SINTO, computer 6 drops the internal loop in operation and will receive information of the cause that produced the present interrupt signal. For this purpose, it reads register 13C which connects computer 6 to time control arrangement circuit 11.

Binary data MILIN, specific to real-time unit elapse which is contained in register 13C indicates, in the described example, the cause of the interrupt.

After having read such data — and possibly having made other operations, such as reading registers 13AC and 13BC wherein data from operational computers to be sent to their peripheral equipment are stored, — computer 6 transmits a start order in the form of two signals CIRQ and DEM for, respectively, starting again and addressing interface 7.

These two data signals are applied to start-again synchronization circuit 19 which delivers three binary signals T0, T1, TN, which are shifted in time with respect to each other so as to synchronously start the various counters and the operational computers taking into account the geographical position of these components and the simulation devices, and the control logic which are involved for turning each of computers 1 on again.

Signal TN is applied to the on-input of counter 9 and causes real-time to be counted in counter 9, signal T0 is applied to down-count control input of counter 10 and causes counter 10 to count down from the value reached at the time computer 1B is stopped.

Signal T1 is applied to the input of reactivation circuit 20 which stored in a memory the order of the sequence of stops of computer 1 under the control of time control arrangement, these stops being made known to circuit 20 by signals AH and BH. Circuit 20 transmits a start order ST when receiving signal T1 to the first stopped operational computer, that is in the example employed herein the order AST to computer 1A, which then resumes its normal operation.

At the end of the count-down in counter 10, counter 10 delivers signal TZ to circuit 20. Then circuit 20 delivers a binary start order ST to the still stopped computer 1, that is in the example employed herein the order BST to computer 1B which resumes its operation.

A second stop event occurs when a computer 1 transmits an input-output order to peripheral equipment, that is, to computer 6 in the environment simulation arrangement of the present invention.

In this case, the involved computer, for example, computer 1A simultaneously transmits an order — which, for example, comprises the address of the concerned peripheral equipment, possibly data to be transmitted to that peripheral equipment and control bits — and an accompanying binary data AIRQ which validates binary data forming the order. The said order is transmitted to register 13AC in the described example, and data AIRQ is transmitted to register 13A and, hence, to time control arrangement 11 so as to signal the hang-up condition of computer 1A. Data AIRQ activates, on the one hand, one output of circuit 16 which delivers a pulsed binary signal AR specific to computer 1A and the second output of circuit 16 which delivers stable binary signal ARDC.

Signal AR is applied to counter 9 and to circuits 15 and 21 via OR circuit 17. Thus, signal AR controls real-time count stop, transmission of stop signal BSBS to computer 1B still in operation and transmission SINTO to computer 6.

Signal ARDC is applied to the input of counter 10 via NAND gate 18 and causes counter 10 to count on at the rate of clock 8.

As before, computer 1B is stopped at the end of the sequence and transmits data BCPUH via register 13B. Data BCPUH produces signal BRDC which is added to ARDC at the inputs of NAND gate 18, which causes counter 10 to stop, counter 10 having measured a time interval equal to the time from the hang-up time of the first computer 1A to the sequence end stop of computer 1B.

Simulation computer 6 reads data from register 13AC, after information as to the nature of the interrupt as represented here by binary data AIN in register 13C, where such data is stored after having been written in in a conventional manner, not shown, for simplification purposes.

In the described embodiment, if the concerned input-output operation corresponds to a data transmission to peripheral equipment, computer 6 reads data from register 13AC and must transmit response data IARQ to the involved operational computer who has to acknowledge receipt.

If the concerned input-output operation corresponds to a request for data from peripheral equipment, computer 6 reads request data from register 13AC or 13BC and transmits response data and data IARQ to validate this data.

In each case, signal IARQ and accompanying signals, if any, are transmitted after a certain delay which corresponds to the peripheral equipment response time. Computer 6 transmits orders CIRQ and DEM to circuit 19 to cause it to start again. Circuit 19 then sequentially delivers signals T0, T1, TN, in the described example. Signal TN controls real-time counting in counter 9 and signal T0 controls counting down in counter 10. Signals T1 and TN are applied to the two inputs of a reactivation circuit 22 which stores hang-up sequence orders for computers 1, such hang-up conditions being indicated by data AR and BR. Circuit 22, which has previously received data AR in the described example and now receives signal T1, delivers a signal ADC which causes counter 14A to count down.

When count-down has ended in counter 14A, it transmits reconnaissance data AIARQ to computer 1A. Data AIARQ validates data contained in register 13AC and controls the turning on of computer 1A, that is in a hang-up condition. In the described embodiment, data contained in either register 13AC or 13BC corresponds, on the one hand, to data relative to the simulated peripheral equipment condition code, that is to its condition in the case of response to an order transmitting data to the simulated peripheral equipment and, on the other hand, to data relative to the simulated peripheral equipment condition code and to data delivered from it, in the case of response to a data request from the computer.

As previously, during the time of the foregoing operation, counter 10 counts down and, when it is reset it transmits signal TZ to circuit 20 which delivers order BST to computer 1B. It must be understood that in this case start order for computers 1 depends only on initial values of count-down in counters 10 and 14A, these values being obviously independent.

A third stop event occurs when the two computers 1 are quasi simultaneously set in a hang-up condition so that each computer can transmit an input-output order.

The computer 1, for example computer 1A, which is first turned to a hang-up condition, delivers data AIRQ to circuit 16, which causes signals AR and ARDC to be generated. Signal AR stops counter 9, controls transmission of order BSBS and interrupt SINTO. Order BSBS has no effect on computer 1B, which itself has turned to a hang-up condition in order to transmit an input-output order and has deliver data BIRQ. Circuit 16 produces signals BR and BRDC. Signal BRDC stops counter 10.

Computer 6 will read the interrupt reason in register 13C, which stores in this case data AIN and BIN as well as their arrival rank indicated by their indicia 1 or 2. After having read data stored in register 13AC for computer 1A, computer 6 prepares a response for supplying register 13AC with suitable information and loads timing counter 14A to the value corresponding to the involved simulated peripheral equipment response time, such a loading being made through data IFD validated by data ATIF.

Then computer 6 prepares a response for computer 1B by providing register 13BC with suitable information and loads counter 14B to the value of the desired peripheral equipment response time via data IFD different from the first one and validated by data BTIF.

Computer 6 transmits to circuit 19 orders CIRQ and DEM. Circuit 19 sequentially delivers signals T0, T1, TN which control counters 9 and 10 and are applied to circuit 22.

Circuit 22 has stored the order of the successive hang-up conditions for computers 1A and 1B, such conditions having been successively indicated by data AR and data BR. Then circuit 22 delivers a count-down order signal DC to counter 14 associated with the first computer turned to a hang-up condition, that is in the described example signal ADC to counter 14A. Signal ADC causes counter 14A to begin to count down from the value previously set by computer 6 and transmitted in the form of data IFD.

During that time, shift counter 10 is continuing to count down and the end of the count-down is indicated by signal TZ. Signal TZ is applied to circuit 20, where it has no effect, and to circuit 22. After having received signal TZ, circuit 22 delivers a second signal DC to counter 14 associated with the second computer turned to a hang-up condition in order to cause the counter to count down, that is signal BDC to counter 14B in the described example.

At the count-down end, each counter 14 transmits data IARQ to the computer with which it is associated in accordance with a process described in conjunction with the previously mentioned case.

A fourth stop event occurs when one of the computers 1 is turned to hang-up condition while the other computer is waiting for a read signal IARQ, that is for the count-down period of one of the counters 14.

Computer 1, for example computer 1A, which is in a hang-up condition, while the other computer 1B is itself in a hang-up condition for waiting a read signal — that is BIARQ — delivers data AIRQ, indicating its hang-up condition with respect to circuit 16. Information AR delivered from circuit 16 stops real-time counter 9 and controls the transmission of interrupt data SINTO to computer 6.

Data AR applied to circuit 22 suppresses data BDC, which allowed counter 14B to count down. As previously, computer 6 is operated to read the interrupt reason, that is AIN in register 13C, then it reads data stored in register 13AC, it prepares the response to be transmitted to computer 1A and loads register 13AC and counter 14A.

Circuit 19 delivers T0, T1, TN when receiving orders CIRQ and DEM. Signal TN starts real-time counter 9, signal T0 has no effect on counter 10 which is at rest. Signal T1 controls the transmission from circuit 22 of count-down order signal DC to the counter 14 which is associated with the computer 1, which has delivered the last hang-up data, that is the transmission of signal ADC to counter 14A in the described example. Signal TN controls the transmission via circuit 22 of count-down order signal DC to counter 14 which has been interrupted, that is signal BDC to counter 14B in the described example.

The time duration elapsed between those two count-down conditions, that is between T1 and TN is provided to take into account the time shift from hanging-up computer 1, which has already turned on, that is computer 1A in the described example, and count-down stop of counter 14B as a result of that hang-up condition.

As previously, the two computers 1 are started again by counters 14 according to a process similar to the previously mentioned one.

According to an alternative of the device according to this invention, the time control arrangement comprises at least a stop control counter 24 for controlling a stop at the end of a sequence and at that time, to cause the operational group to stop at any selected time following a predetermined time.

Counter 24 is controlled by clock 8 and controls circuit 15 in the same manner as real-time counter 9 at the end of a step.

Counter 24 is selected by data CTIF delivered from computer 6, for example, at the occurrence of a stop caused by counter 9 at the end of a step. It is loaded via data IFD validated by data CTIF. Counter 24 is started by the same signal as counter 9 and transmits at count-down end a stop signal MICIN to circuit 15 to control sequence end stop of computers 1 and register 13C in order to indicate the interrupt reason to computer 6. Counter 24 produces a finer analysis of those steps by allowing a stop at a time equal to a step fraction and, for example, to a multiple of 1 microsecond. Moreover, it must be understood that several identical counters 24 can be employed so as to be able to program several successive stops inside a short step.

While we have described above the principles of our invention in connection with specific apparatus, it is to be clearly understood that this description is made only by way of example and not as a limitation to the scope of our invention as set forth in the objects thereof and in the accompanying claims.

We claim:

1. A simulation device designed for the development of a program to be used in a real-time operated system including first and second computers operating on a load-sharing basis, said simulation device comprising:
    a third computer coupled to said first and second computers to simulate their peripheral equipment in a real system by exchanging with said first and second computers data which would normally be exchanged between said first and second computers and their real system peripheral equipment; and
    a real-time control arrangement including
        a real-time counter coupled to said first, second and third computers to count real operation time of a program for said real-time system, to subdivide said real operation time into equal steps and to transmit a predetermined signal at the end of each of said steps,
        a shift counter coupled to said first, second and third computers to delay the turning on of one of said first and second computers with respect to the turning on of the other of said first and second computers by a time equal to the time elapsed between a stopping of said one of said first and second computers and a stopping of said other of said first and second computers when both stoppings occurred after a simultaneous operating period of said first and second computers,
        two timing counters, each of said timing counters being coupled to a different one of said first and second computers and said third computer to delay the turning on of an associated one of said first and second computers with respect to the turning on of the other of said first and second computers by a time equal to a simulated selected real system peripheral equipment response time after said associated one of said first and second computers was stopped due to the transmission of a data input-output order to a simulated selected real system peripheral equipment, and
        a clock to synchronize the operation of said first, second and third computers, said real-time counter, said shift counter and said two timing counters.

2. A device according to claim 1, wherein each of said first and second computers is turned to a hang-up condition when it transmits a data input-output order;
    said first and second computers and said third computer are alternately operated; and
    said control arrangement further includes
        a computer stop logic circuit coupled to said real-time counter and said first and second computers, said computer stop logic circuit being activated by said predetermined signal to transmit a first sequence end stop order to one of said first and second computers and a second sequence end stop order to the other of said first and second computers and being activated by said data input-output order transmitted by one of said first and second computers to transmit one of said first and second sequence end stop orders to said other of said first and second computers,
        a third computer interrupt means coupled to said first, second and third computers, said interrupt means being activated by stop data from the first of said first and second computers to stop in response to the associated one of said first and second sequence end stop orders to transmit an interrupt order to said third computer which has become operative and being activated by said data input-output order from one of said first and second computers to transmit said interrupt order to said third computer which has become operative, and
        reactivation means coupled to said shift counter and said first, second and third means for reactivating said first and second computers, said real-time counter and said two timing counters upon receipt of start data from said third computer after said third computer has completed its operation started by receiving said interrupt order.

3. A device according to claim 2, wherein said control arrangement further includes
    real-time counter stop means coupled to said real-time counter, said first and second computers, said real-time counter stop means being activated by stop data from the first of said first and second computer stopped by the associated one of said first and second sequence end stop order to hold said real-time counter at the count it had achieved when it is stopped and being activated by a data input-output order from either of said first and second computers to hold said real-time counter at the count it had achieved when it is stopped.

4. A device according to claim 3, wherein said control arrangement further includes
    shift counter start means coupled to said shift counter and said first and second computers, said shift counter start means being activated by stop data from the first of said first and second computers stopped by the associated one of said first and second sequence end stop order to start said shift counter and being activated by a data input-output order from either of said first and second computers to start said shift counter, and
    shift counter stop means coupled to said shift counter and said first and second computers, said shift counter stop means being activated by one of said stop data and said hang-up data transmitted by that one of said first and second computers that is still operative after having started said shift counter to stop said shift counter at a count after a time elapse corresponding to the difference in time between the stopping of both said first and second computers.

5. A device according to claim 4, wherein said control arrangement further includes
    first means coupled to said two timing counters and said third computer, said first means being responsive to data from said third computer to select one of said two timing counters, said data from said third computer being produced in response to interrupt data received at said third computer because of a data input-output order being transmitted by one of said first and second computers associated with the selected one of said two timing counters, and
    second means coupled to said two timing counters and said third computer to set said selected one of said two timing counters at a count corresponding to a simulated selected peripheral equipment response time, said count of said selected one of said two timing counters being set by data from said third computer.

6. A device according to claim 2, wherein
said reactivation means includes
   a synchronization circuit coupled to said third computer to produce output signals in response to said start data, said output signals being spaced in time to start said first and second computers, said shift counter and said two timing counters in the proper sequence to maintain synchronization thereof, the time spacing of said output signals taking into account the geographic location of said first and second computers, said shift counter and said two timing circuits and the circuits employed therein.

7. A device according to claim 6, wherein
said reactivation means further includes
   a first reactivation circuit coupled to said first and second computers, said synchronization circuit and said shift counter, said first reactivation circuit storing sequence end stop data transmitted from said first and second computers and to transmit a start order to either of said first and second computers, on one hand, when a count end signal is received from said shift counter and said first and second computers to be started has transmitted the last stored stop data and, on the other hand, when a signal is received from said synchronizing circuit and said first and second computers to be started have transmitted the first of two simultaneously stored stop data, said signal from said synchronizing circuit being earlier than said count end signal, and
   a second reactivation circuit coupled to said first and second computers and said two timing counters, said second reactivation circuit storing accompanying data indicating that one of said first and second computers is in a hang-up condition and to transmit a reset order to said one of said first and second computers when receiving said count end signal from an associated one of said two timing counters and said one of said first and second computers has transmitted said still stored accompanying data.

8. A device according to claim 7, wherein
said second reactivation circuit further includes
   first and second connections each coupled to a different one of two outputs from said synchronization circuit,
   a third connection to the output of said shift counter,
   said first and second connections activating one of said two timing counters associated with said first and second computers whose accompanying data is stored, on the one hand, when receiving a signal from said synchronization circuit if the associated one of said first and second computers has transmitted the first stored accompanying data and, on the other hand, when receiving said count end signal from said shift counter if the associated one of said first and second computers has transmitted the last accompanying data out of two simultaneously stored accompanying data.

9. A device according to claim 2, wherein
said control arrangement further includes
   at least one sequence end stop control counter coupled to said stop and said computer stop logic circuit to produce, at any selected real-time, a sequence end stop order to activate said computer stop logic circuit.

* * * * *